INVENTORS.
MARK B. VAN WAGONER
BY GINO TESTAGUZZA

Robert A. Sloman
ATTORNEY

United States Patent Office 3,230,375
Patented Jan. 18, 1966

3,230,375
LAMINATED RADIATION RESISTANT PANELS
Mark B. Van Wagoner and Gino Testaguzza, both of 3681 E. Drahner, Oxford, Mich.
Filed Dec. 4, 1961, Ser. No. 156,595
8 Claims. (Cl. 250—108)

The present invention relates to panels or walls using a basic material of polyester or epoxy resin, which is constructed to resist radio activity as "fallout," gamma ray radiation, X-ray radiation, and other harmful radiation.

It is the object of the present invention to provide a radiation resistant panel which may have incorporated therein heat and fire-resistant characteristics.

It is another object of the present invention to provide a radiation resistant panel which consists of a series of laminations which include the use of polyester or epoxy resins, sand, cement and powdered lead, or other forms of lead, and in conjunction with the impregnated fibreglass fabrics.

It is another object of the present invention to provide a radiation and fire-resistant panel formed and constructed in a suitable die, and which includes a surface coat, which is made from a combination in varying proportions of a resin, fine sand, asbestos cement, and with the addition of powdered lead, and in conjunction with the said surface coat one or more layup layers of fibreglass fabric which has been impregnated with a liquid mixture of resin, sand, asbestos cement and powdered lead.

It is contemplated as part of the present invention that the radiation resistant panel may be constructed so as to include the surface coat of a fibreglass fabric which has been impregnated with a fluid mixture or combination of ingredients which include sand, resin and cement or a combination which includes sand, resin, asbestos cement and powdered lead, and wherein there is an intermediate layer of sheet lead applied to the outer layer and thereabove an additional surface coat corresponding to the first mentioned surface layer to provide a sandwich or laminated form.

It is contemplated in conjunction with the said radiation resistant panel that there may be a series of alternate layers of lead sheeting and impregnated fibreglass up to the desired thickness depending upon the problem encountered and the degree of radiation to be resisted.

It is another object of the present invention to provide a radiation resistant assembly which comprises a pair of spaced interconnected panels wherein one panel includes a dried homogeneous lamination including a combination of polyester resin in liquid form, fine sand, and an asbestos cement to which powdered lead may be added, as desired, and additioned thereto impregnated fiberglass layers; the other panel incorporating a pair of spaced inner and outer surface layers of uniform thickness, the said inner and outer layer being in the nature of an impregnated fibreglass fabric and with a sheet of lead interposed between the said latter inner and outer surface layers.

It is contemplated also in conjunction with this portion of the present invention that there will be an air space between the two panels which air space may be selectively filled with merely air, an insulating medium, sand, lead sheeting or lead cloth.

It is contemplated also as a part of the present invention that there be provided a precast cement panel or block, which includes the mixture of powdered lead, sand, Portland cement and water, or in place of the water a polyester or epoxy resin, in liquid form.

In conjunction with this assembly, it is contemplated also that the panel may be rendered heat and fire-resistant by the addition thereto of a heat and fire-resistant material such as antimony trioxide or Chlorowax 70.

It is a further object of the present invention to provide a radiation resistant protective coating for floors and walls and ceilings which includes a mixture in combination of powdered lead, fine sand, Portland cement and water, or in place of the water an epoxy or polyester resin in liquid form to which may be added one from a group of heat and fire-resistant materials.

These and other objects will be seen from the following specification and claims in conjunction with the appended drawing in which:

It is contemplated that the above drawings illustrate merely preferred embodiments of the invention and that other embodiments are contemplated within the scope of the claims hereinafter set forth.

The present invention is particularly directed to radiation resistant panels to which the characteristic of heat and fire-resistance may be applied by the application thereinto of suitable heat and fire-resistant materials, as for example, and by way of illustration, antimony trioxide or Chlorowax 70, a product produced by Diamond Alkali Company in Cleveland, Ohio, and available on the market commercially.

The ingredients which are employed in conjunction with the present radiation resistant panels include a resin, such as a polyester resin, or an epoxy resin, asbestos cement, a fine washed sand, lead in powdered form, in sheeting form, in foil or in other form, and fibreglass fabric, which has been impregnated with a compound which includes a resin, asbestos cement, sand and with the addition, as desired, of lead in powdered form, for illustration.

Figure 1:
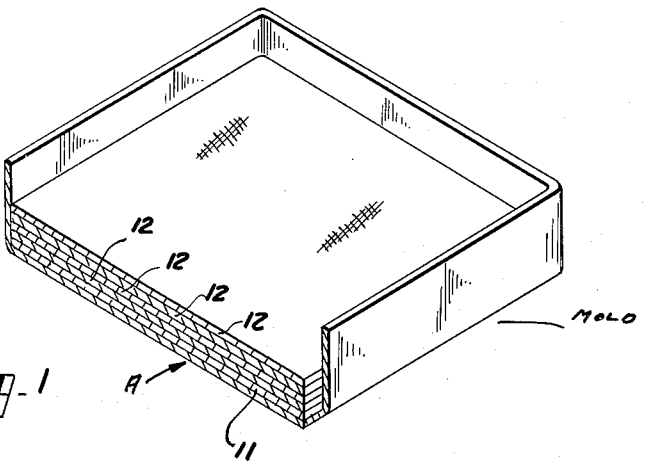
FIG. 1 is a fragmentary perspective view of one form of panel construction and a portion of the mold in which it is produced.

With reference to FIG. 1 of the drawing, there is shown one embodiment of a radiation resistant panel wherein there is employed a suitable depressed mold of a polished metal or polished glass of rectangular or square form within which the molded panel is constructed.

In the embodiment of the invention shown in FIG. 1, there is applied to the said mold a surface coat of a relatively thick liquid mixture, which includes resin in liquid form, such as polyester resin or epoxy resin to which has been added fine washed sand, asbestos cement, and possibly a quantity of powdered lead.

If a hard outer surface is desired, the combination of ingredients in the surface coat omits the powdered lead.

If a fire and radiation resistant panel is desired wherein the outer surface is not so hard, then a quantity of powdered lead is employed, as hereunder set forth. A complete mixture of these ingredients is applied to the mold in a liquid form, wherein it begins to dry and becomes tacky.

As a second step in the formation of the panel shown in FIG. 1, there is provided in addition to the original layer designated generally at 11, and adhesively secured thereto an inner layer of fibreglass fabric, shown at 12, which has been impregnated with a combination of liquid resin, fine sand, asbestos cement and powdered lead.

One form of radiation resistant panel includes the layers 11 and 12. It is contemplated, however, that it may be desired in many situations to increase the thickness of the panel by the application of a series of additional layup layers of similarly impregnated fibreglass fabric, such as indicated by the numeral 12 in FIG. 1.

One illustrative example showing the ingredients employed in the formation of the surface coat is as follows.

For a one square foot panel—

|  | Pounds |
|---|---|
| Resin | ½ |
| Sand | ½ |
| Asbestos cement | ¼ |
| Powdered lead | 2 |

Set forth in approximate proportions by weight, these would be as follows, approximately:

|  | Percent |
|---|---|
| Polyester resin or epoxy | 16 |
| Fine washed sand | 16 |
| Asbestos cement | 8 |
| Powdered lead | 60 |

It is contemplated that the proportions of these ingredients may vary. For example in the composition which omits the powdered lead, if it is desired to have an outer surface coat which is harder, ingredients would be as follows:

|  | Percent |
|---|---|
| Polyester resin or epoxy resin | 40 |
| Fine sand | 40 |
| Asbestos cement | 20 |

The illustrative embodiment wherein the powdered lead is employed would be approximately as follows by weight:

|  | Percent |
|---|---|
| Epoxy or polyester resin (in liquid form) | 16 |
| Sand | 16 |
| Asbestos cement | 8 |
| Powdered lead | 50 |
| Antimony trioxide | 10 |

It is contemplated also that the proportions of the ingredients may be varied in the following ranges, as for example approximately:

|  | Percent |
|---|---|
| Polyester or epoxy resin | 11 to 21 |
| Sand | 11 to 21 |
| Asbestos cement | 6 to 10 |
| Powdered lead | 55 to 65 |

In order to render the panel heat and fire-resistant, it is contemplated that either of the following, or other equivalent fire-resistant materials may be added in the proportion of approximately 10-percent by weight, namely antimony trioxide or Chlorowax 70, for illustration.

To the surface coat above described, being the element 11 shown in the drawing, this layup of fibreglass fibre is provided as shown at 12. In the surface coat initially formed within the mold, shown in FIG. 1, a mixture of ingredients in combination is relatively viscous and thick. The impregnating mixture for the fibreglass consists of a combination of ingredients in a more fluid form which include, sand, resin, asbestos cement and powdered lead.

The relative proportion of ingredients of these elements in the impregnating mixture is substantially the same or within the ranges above set forth, and is not repeated.

While the surface coat 11 is still in tacky form, the impregnated fibreglass lamination 12 is applied thereto to assure adhesive juncture therewith. The fibreglass matting employed may be impregnated by dipping the mat in the impregnating mixture; the mixture may be brushed upon the fibreglass, or sprayed thereon, or there may be employed a multi-nozzle spray gun by which in finely divided form there is sprayed onto the surface coat 11, a layer of the desired depth of powdered lead, resin and glass fibres which mix upon contact with each other and adhere to the base boat 11. To this impregnated mixture is added a correct amount of finely divided sand.

The illustrative panel described above in connection with FIG. 1 may thus consist of the surface coat 11, and the inner lamination of impregnated fibreglass, or alternately there may be additional layup layers 12 applied to the initial impregnated fibreglass layer, these layers being successively applied to each other until the desired thickness is obtained, depending upon the radiation problem involved.

The thickness of the panel may be of ¼ of an inch or up to an inch, or much greater, as desired.

It is contemplated, as part of the present invention where a heat and fire-resistant material is added in an approximate proportion of 10-percent by weight, then in that case the proportions must be similarly varied. For example, the largest proportion being the powdered lead could be proportionately reduced.

Figure 2:
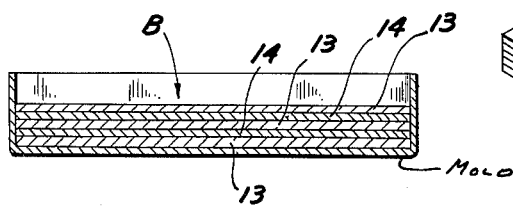
FIG. 2 is a fragmentary longitudinal section of another form of radiation resistant panel and the form within which it is molded, schematically shown.
Figure 3:
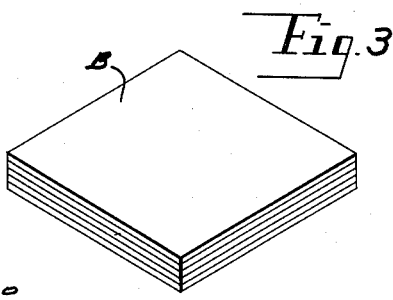
FIG. 3 is a perspective view of the molded panel produced in FIG. 2.

Another embodiment of the present invention is shown in FIGS. 2 and 3, wherein there is provided a radiation and fire-resistant panel, which includes within a similar mold, inner and outer surface layers 13 of uniform thickness with each layer including a dried fibreglass fabric which has been impregnated with a homogeneous combination by weight approximately of 40-percent polyester or epoxy resin in liquid form, and 40-percent fine sand, and 20-percent asbestos cement.

It is contemplated, however, that with the addition of powdered lead to the impregnating mixture, the proportions would vary as follows, approximately by weight:

|  | Percent |
|---|---|
| Resin | 16 |
| Sand | 16 |
| Asbestos cement | 8 |
| Powdered lead | 60 |

The panel defined in FIGS. 2 and 3 includes an intermediate layer 14 of uniform thickness of sheet lead which is adhesively interposed between the outer layers 13. Thus, as desired, and depending upon the properties sought, the panel may consist of a sandwich including inner and outer layers with an intermediate layer of sheet lead.

The inner and outer layers may or may not include as a part of the impregnating material in the fibreglass fabric the quantity as set forth of powdered lead.

It is contemplated also as a part of the present disclosure in conjunction with the panel defined in FIGS. 2 and 3 that there may be alternate layers of impregnated fibreglass fabric and lead sheeting, as further shown in FIG. 2, it being noted, however, that the final coat or top layer will consist of the impregnated fibreglass.

Figure 4:
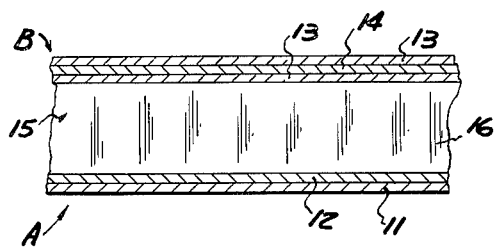
FIG. 4 is a fragmentary longitudinal section of a slightly different form of radiation and fire-resistant, or heat-resistant panel.
Figure 5:
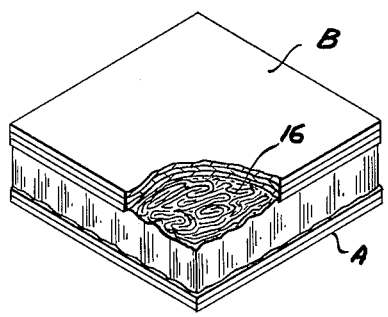
FIG. 5 is a perspective view thereof, partially broken away upon one side to reveal its internal structure.

A third variation of the present invention is disclosed in a slightly different form of panel shown in the drawing in FIGS. 4 and 5, and wherein it is noted that the said combination includes a panel A, and a panel B in spaced apart relation with an inner space 15 therebetween.

It is contemplated as a part of the present invention that one of the outer panels, as for example, the panel A is made in accordance with the radiation resistant panel of FIG. 1, and that the other outer panel B is made in accordance with the radiation resistant panel B, shown in FIGS. 2 and 3.

The air space 15, fragmentarily illustrated in FIG. 4 is enclosed and may in one embodiment of the invention merely be a sealed air space, or alternately may contain any suitable insulation material such as rock wool, spun fibreglass, or the like. It is contemplated, however, that the space may be of a honeycomb nature, and may be filled with lead sheeting, a lead cloth, or may be filled with sand, as desired, and to meet the particular radiation problem involved.

FIG. 4 shows the panel A corresponding to FIG. 1, as including the surface coating 11, and the impregnated fibreglass layer 12. The thickness of the fibreglass layer 12 might depend upon whether a series of fibreglass impregnated layup layers are additionally employed, such as is shown in FIG. 1.

By the same token, the panel B coresponding to FIG. 2 includes the sandwich type of construction wherein there is an inner and outer layer of impregnated fibreglass and therebetween a layer of lead.

Still another variation of the present invention is contemplated wherein there is employed a mixture of lead and sand and Portland cement to which either water or epoxy or a polyester resin in liquid form may be added to form a precast panel.

For example, one illustrative embodiment would be as follows:

Powdered lead
Fine sand
Portland cement
Water

An alternate combination of ingredients to form the precast radiation resistant panel might include as follows:

Powdered lead
Fine sand
Portland cement
Polyester or epoxy resin in liquid form

Such precast cement block panel, or the like, can be furthermore rendered heat and fire-resistant by the addition thereto an approximate percentage of 10-percent by weight of antimony trioxide or Chlorowax 70, above referred to. It is contemplated in this connection, however, that there are other equivalent ingredients on the market which have a known heat and fire-resistant character, which may be regarded as equivalent to the ones defined.

Instead of casting the above described panel or block as set forth, this combination of ingredients may be employed to provide a protective coating for floors, ceilings and walls, and wherein in combination the above set forth two groups of ingredients may be employed, which may be in plastic form or wet, and directly applied to provide a protective surface coating.

It is contemplated as part of the present invention that the panels which are characterized as being radiation resistant or heat-resistant or both, and may be provided in various colors as desired merely by the addition of suitable pigments in nominal proportions, the detail of which is omitted in this disclosure.

The above described precast cement block panels, and the like, are hereunder set out in the form of specific examples, wherein the blocks were constructed for testing purposes of the dimensions 3 x 3 inches by 1½ inches in thickness.

SAMPLE NO. 1

| | Parts |
|---|---|
| Sand | 2 |
| Cement (Portland or other) | 1 |
| Pulverized lead | 3 |
| Water (sufficent to mix) | |

SAMPLE NO. 2

| | Parts |
|---|---|
| Sand | 2 |
| Cement | 1 |
| Pulverized lead | 4 |
| Water (sufficient to mix) (depending upon dryness of sand employed) | |

SAMPLE NO. 3

| | Part |
|---|---|
| Sand | 1 |
| Pulverized lead | 1 |
| Liquid resin | ¼ |

SAMPLE NO. 4

| | Part |
|---|---|
| Plaster | 1 |
| Pulverized lead | 1 |
| Water (sufficient to mix) | |

SAMPLE NO. 5

| | Part |
|---|---|
| Plaster | 1 |
| Pulverized lead | 1 |
| Asbestos cement | 1 |
| Liquid resin | ¼ |

Each of the foregoing specific samples were tested against X-ray radiation under the following conditions:

A total of 450 ma./s. were employed using 30 ma. at 72 kv. for a 15 second exposure, at 32 inches tube distance. X-ray films were employed, and no evidence of X-ray penetration was found.

In connection with the foregoing specific Samples 1 through 5, while pulverized lead has been specified, it is contemplated that a powdered lead could be employed. Furthermore, other types of cement other than Portland cement may be employed as desired.

The above described radiation protective coating is adapted for wood, plaster, plastic, metal, or any other surface, and is designed among other things to resist "soft" or secondary radiation.

Set out here below are several specific examples of such protective coating:

*Example No. 1*

| | Parts |
|---|---|
| Lacquer—or other binder | 1 |
| Powdered (pulverized) lead | 3 |
| Asbestos cement | 1 |

This protective coating has been tested against direct X-ray radiation, and will give good protection against such radiation in excess of 10 ma./sec.

It is contemplated in this protective coating that the amount of lead may be increased.

*Example No. 2*

| | Parts |
|---|---|
| Lacquer—or other binder | 1 |
| Powdered lead | 6 |
| Asbestos cement | 1 |

The foregoing Example No. 2 resists penetration of direct X-ray radiation up to 20 ma. per second. With two coats of Example No. 2, good radiation protection is provided against X-ray as tested up to 150 ma./sec.

It appears that the asbestos cement in Examples 1 and 2 holds the powdered lead in uniform suspension for even application to the surface to be coated. The protective coating is preferably brushed on to the surface to be protected.

It is contemplated that the same proportions may be used, substituting a lacquer primer, and obtains substantially the same radiation resistance. Any other binder may be used.

*Example No. 3*

| | Parts |
|---|---|
| Super Flash Sand Primer No. PMS–452 (commercially available) | 1 |
| Powdered lead | 6 |
| Asbestos cement | 1 |

One coating of Example No. 3 has been tested and found to be to have good radiation protective characteristics, or will resist radiation up to 20 ma./sec., of direct X-ray. In this connection it is believed that the X-rays used in the testing are equivalent to corresponding gamma rays.

By addition of two parts of asbestos cement to the formula, a putty-like, or caulking compound is produced, which is radiation resistant. This may be used to seal joints, or cracks, or other areas on structures designed for radiation protection, as in the following example:

*Example No. 4 (Caulking compound)*

| | Parts |
|---|---|
| Lacquer (or lacquer primer)—or other binder | 1 |
| Powdered lead | 6 |
| Asbestos cement | 2 |

The caulking compound gives radiation resistant protection, and varies with the thickness of spreading. In the samples tested, the layer was 1/8 inch thick, and gave good X-ray radiation resistance in excess of 100 ma./sec.

While lacquer has been specified above in certain of the foregoing examples, it is contemplated that any other binder could be employed. For example, a lacquer thinner could be used in the foregoing examples in order to reach the desired consistency for adequate spreading. The binder and the thinner evaporate substantially, leaving a protective coating of lead and asbestos cement.

Having described our invention, reference should now be had to the following claims.

We claim:

1. A radiation resistant panel comprising a surface layer of uniform thickness including in combination by weight approximately 40-percent epoxy resin; 40-percent fine sand, and 20-percent asbestos cement; and adhesively joined to said surface layer a layer of fibreglass fabric impregnated by weight approximately with 16-percent epoxy resin, 16-percent fine sand, 8-percent asbestos cement and 60-percent powdered lead.

2. A radiation resistant panel comprising a surface layer of uniform thickness including a dried homogeneous combination by weight approximately 16-percent polyester resin, 16-percent fine sand, 8-percent asbestos cement and 60-percent powdered lead; and adhesively joined to said surface layer a layer of fibreglass fabric impregnated by weight with approximately 16-percent epoxy resin, 16-percent fine sand, 8-percent asbestos cement and 60-percent powdered lead.

3. A radiation resistant panel comprising a surface layer of uniform thickness including a dried homogeneous combination by weight approximately 11 to 21 percent epoxy resin, 11 to 21 percent fine sand, 6 to 10 percent asbestos cement and 55 to 65 percent powdered lead; and adhesively joined to said surface layer a layer of fibreglass fabric impregnated by weight with approximately 11 to 21 percent epoxy resin, 11 to 21 percent fine sand, 6 to 10 percent asbestos cement and 55 to 65 percent powdered lead.

4. A radiation resistant panel comprising a surface layer of uniform thickness including a dried homogeneous combination by weight of approximately 16-percent polyester resin, 16-percent fine sand, 16-percent asbestos cement, 50-percent powdered lead and 10-percent antimony trioxide; and adhesively joined to said surface layer a layer of fibreglass fabric impregnated with by weight approximately 16-percent polyester resin, 16-percent fine sand, 8-percent asbestos cement, 50-percent powdered lead, and 10-percent antimony trioxide.

5. A radiation resistant panel comprising a pair of surface layers of uniform thickness, each layer including a dried fibreglass fabric impregnated with a homogeneous combination by weight approximately of 40-percent polyester or epoxy resin, 40-percent fine sand, and 20-percent asbestos cement; and an intermediate layer of sheet lead of uniform thickness therebetween.

6. A radiation resistant panel comprising a pair of surface layers of uniform thickness, each layer including a dried fibreglass fabric impregnated with a homogeneous combination by weight approximately of 16-percent polyester resin, 16-percent fine sand, 8-percent asbestos cement, and 60-percent powdered lead; and an intermediate layer of sheet lead of uniform thickness therebetween.

7. A radiation resistant assembly comprising a pair of spaced interconnected panels, one panel including a surface layer consisting of a dried homogeneous combination by weight approximately of 40-percent polyester resin, 40-percent fine sand and 20-percent asbestos cement, and adhesively joined to said surface layer, a layer of fibreglass fabric impregnated with by weight, approximately 16-percent epoxy resin, 16-percent fine sand, 8-percent asbestos cement, and 60-percent powdered lead, the other panel including a pair of surface layers of uniform thickness each including a dried fibreglass fabric impregnated with a homogeneous combination by weight approximately of 16-percent polyester resin, 16-percent fine sand, 8-percent asbestos cement, and 60-percent powdered lead, an interior layer of sheet lead of uniform thickness between and on its opposite sides adhering to said surface layers, there being an enclosed air space between said panels and a filler in said air space selected from the group consisting of insulating material, lead sheeting, lead cloth and sand.

8. A radiation resistant panel comprising a surface layer of uniform thickness including a dried homogeneous combination of, by weight, approximately: 7–25% resin, 7–25% fine sand, 55–70% powdered lead, and 4–13% asbestos cement; and adhesively joined to said surface layer, a layer of fibreglass fabric impregnated with a dried homogeneous combination of, by weight, approximately: 7–25% resin, 7–25% sand, 4–13% asbestos cement, and 55–70% powdered lead.

References Cited by the Examiner

UNITED STATES PATENTS

| | | | |
|---|---|---|---|
| 2,480,298 | 8/1949 | Happoldt | 117—137 |
| 2,569,539 | 10/1951 | Schultz | 260—37 |
| 2,608,500 | 8/1952 | Del Mar et al. | |
| 2,726,339 | 12/1955 | Borst | 106—97 |
| 2,773,459 | 11/1956 | Sechy | 250—108 |
| 2,788,291 | 4/1957 | Stertz | 250—108 |
| 2,850,890 | 9/1958 | Rubenstein. | |
| 2,858,451 | 10/1958 | Silvisher. | |
| 2,938,937 | 5/1960 | Shenk | 117—137 |
| 3,007,890 | 11/1961 | Twiss et al. | 260—37 |
| 3,061,491 | 10/1962 | Sherrard | 250—108 |
| 3,065,351 | 11/1962 | Weinberger et al. | 250—108 |
| 3,075,925 | 1/1963 | Dunegan | 252—478 |

RALPH G. NILSON, *Primary Examiner.*

HAROLD ANSHER, *Examiner.*

FREDERICK M. STRADER, J. W. LAWRENCE,
*Assistant Examiners.*